US012269758B2

(12) United States Patent
Lucas

(10) Patent No.: US 12,269,758 B2
(45) Date of Patent: Apr. 8, 2025

(54) COLOR REMOVAL SYSTEM AND METHOD

(71) Applicant: Sustainable Water Infrastructure Group, LLC, Seattle, WA (US)

(72) Inventor: William Lucas, Malvern, PA (US)

(73) Assignee: Sustainable Water Infrastructure Group, LLC, Seattle, WA (US)

(*) Notice: Subject to any disclaimer, the term of this patent is extended or adjusted under 35 U.S.C. 154(b) by 185 days.

(21) Appl. No.: 18/098,845

(22) Filed: Jan. 19, 2023

(65) Prior Publication Data

US 2023/0150839 A1 May 18, 2023

Related U.S. Application Data

(63) Continuation-in-part of application No. 17/714,623, filed on Apr. 6, 2022.

(60) Provisional application No. 63/301,523, filed on Jan. 21, 2022, provisional application No. 63/171,251, filed on Apr. 6, 2021.

(51) Int. Cl.
| | |
|---|---|
| *C02F 1/28* | (2023.01) |
| *B01J 20/20* | (2006.01) |
| *C02F 101/10* | (2006.01) |
| *C02F 101/30* | (2006.01) |
| *C02F 103/00* | (2006.01) |

(52) U.S. Cl.
CPC .............. *C02F 1/288* (2013.01); *B01J 20/20* (2013.01); *C02F 2101/105* (2013.01); *C02F 2101/308* (2013.01); *C02F 2103/001* (2013.01)

(58) Field of Classification Search
None
See application file for complete search history.

(56) References Cited

U.S. PATENT DOCUMENTS

| | | | | |
|---|---|---|---|---|
| 7,776,217 | B2 * | 8/2010 | Lucas | ..................... C02F 3/327 |
| | | | | 210/290 |
| 8,048,303 | B2 | 11/2011 | Lucas | |
| 8,940,958 | B2 | 1/2015 | Mclaughlin | |
| 2021/0179467 | A1 * | 6/2021 | Cort | ......................... C02F 9/00 |

FOREIGN PATENT DOCUMENTS

| | | | | |
|---|---|---|---|---|
| CN | 103877937 A | * | 6/2014 | |
| NL | 7905308 A | * | 1/1980 | ............. B01D 39/00 |

OTHER PUBLICATIONS

Mohamad A. M. Salleh, et al., Cationic and anionic dye adsorption by agricultural solid wastes: A comprehensive review, Desalination, vol. 280, Issues 1â3, 2011, pp. 1-13,ISSN 0011-9164 (Year: 2011).*

(Continued)

*Primary Examiner* — Chester T Barry
(74) *Attorney, Agent, or Firm* — Dilworth & Barrese, LLP

(57) ABSTRACT

An improved bioretention system and color removal method combines Water Treatment Residuals (WTRs) with biochar, to provide a color removal effect, especially one beyond what could be achieved with the WTRs or biochar alone. WTRs are commonly used in drinking water treatment plants and can include the material both in its fresh or aged form. Biochar is formed by the pyrolysis of organic material. Water, such as stormwater or surface water can be directed to flow over a color removal media of WTRs and biochar to remove the color, especially color caused by tannins from the water.

17 Claims, 5 Drawing Sheets

Trends in Color Removal Percentage

(56) References Cited

OTHER PUBLICATIONS

English trans. NL7905308 (Year: 1980).*
English trans. NL7905308 merged with original NL7905308 (Year: 1980).*
Bioretention Media Blends to Improve Stormwater Treatment: Final Phase of Study to Develop New Specifications Final Report, King County, Jan. 2020.
Guidance on Using New High Performance Bioretention Soil Mixes, Washington State Department of Ecology, published Oct. 23, 2021.

* cited by examiner

Column Color Removal Performance Trends

COLOR REMOVAL SYSTEM AND METHOD

CROSS REFERENCE TO RELATED APPLICATIONS

This application claims the benefit of provisional application 63/301,523, filed Jan. 21, 2022, and priority as a continuation-in-part of pending application Ser. No. 17/741,623, filed on Apr. 6, 2022, which itself claims the benefit of U.S. Provisional Application Ser. No. 63/171,251, filed on Apr. 6, 2021. The entire contents of these applications are incorporated herein by reference.

BACKGROUND OF THE INVENTION

The invention is directed to a bioretention system and method for removing phosphorus (P) and other contaminants from fluid effluent, such as wastewater, surface water, stormwater runoff, factory effluent, and natural streams. Many contaminants affect the color of the water and their presence can be detected by measuring water color.

More specifically, the invention relates to a system and method for removing contaminants such as excess phosphorous (P) and/or nitrogen (N), such as dissolved P and N in the form of P or N compounds and ions, as well as other contaminants causing color in stormwater and other polluted wastewater effluent. The invention also relates to improved media for long-term color removal and phosphorus retention in bioretention systems and an improved outlet for promoting nitrogen retention.

Bioretention systems often include a basin to contain the effluent to be treated. The bottom of the basin is commonly composed of a porous media that is planted with vegetation. As the effluent passes through the bioretention system, particulate pollutants are removed by filtration. Dissolved phosphorus can be removed from the effluent by biological processes of the system such as vegetative and microbial biomass uptake, as well as chemical adsorption/precipitation processes (herein referred to under the category of sorption), which are effected by properties of the media. As used herein, color in water runoff is largely comprised of organic acids, typically tannins, which are negatively charged, and thus amenable to sorption to positively charged WTRs, similar to the sorption of phosphorus. Dissolved nitrogen can also be removed from the effluent by vegetative and microbial biomass uptake, as well as biological transformations, including denitrification, that eventually convert nitrogen into nitrogen gas.

Bioretention systems have been documented as being cost-effective effluent management facilities for stormwater runoff in terms of removing sediments and sediment-bound phosphorus and nitrogen. This can be particularly relevant in watersheds that have been impacted by urban and/or agricultural runoff to such an extent that they are the subject of what are referred to as Total Maximum Daily Load (TMDL) criteria for nutrients. However, typical bioretention systems with sandy media and free discharge outlets are less effective for long term dissolved nitrogen, dissolved phosphorus and color removal. Methods to increase retention of nutrient pollutants to meet TMDL criteria can be important in the design of effluent management facilities, so they can more effectively process effluent in a more acceptable and efficient manner.

Accordingly, there is a need for improved bioretention systems and methods and for improved media to be used in bioretention systems

SUMMARY OF THE INVENTION

Generally speaking, in accordance with the invention, an improved bioretention and color removal system and method combines Water Treatment Residuals (WTRs), in particular, highly processed WTRs, mixed with biochar, to provide a synergistic retention effect beyond what could be achieved with the WTRs or biochar alone.

WTRs are commonly produced after use in drinking water treatment plants and can include the material both in its fresh or aged form. The aged form is preferred for many applications. WTRs can include the residues resulting from coagulating dissolved organic acids and mineral colloids with either aluminum or iron sulfate. Comprising clay, organic matter and the original metals, these materials are typically very fine textured and can be very resistant to air drying when fresh. Once dry, they form brittle cohesive hydrophobic aggregates. After a period of exposure to weathering, the WTRs become less brittle and hydrophobic and easier to use for media applications.

The use of Water Treatment Residuals (WTRs), and a media for absorbing phosphorus is described in U.S. Pat. No. 7,776,217, the contents of which are incorporated herein by reference. While WTRs can be highly effective for phosphorus removal, it has been determined that blending WTRs with biochar, as described below, can lead to a synergistic improvement in phosphorus removal treatments. It is conventionally believed that biochar is essentially ineffective in the removal of P from effluent streams and standing pools. However, it has been found that careful mixing of properly prepared biochar with carefully selected WTRs can lead to an extremely effective system of phosphorus treatment. It has also been determined that the WTR/biochar media mix is very effective for removing color from water. For example, media disclosed herein can be formulated and adapted to reduce the color of water, especially water colored with tannins, having a color content of at least 50 Platinum Cobalt Units (PCUs) caused by tannins in the water by at least 50% for at least 30 days, preferably at least a year. The color of water with even less than 50 PCU can be reduced. Depending on initial inflow color, flow rates and media exposure, color reductions of over 10%, 50%, 75%, or 95% and even higher can be achieved.

The P retention or color removal media can comprise WTR, biochar and optionally, inert material such as sand and/or other aggregates. The media can be stored in a container, which can have an inlet and outlet. The media can be loaded into a depression in the ground, with the water directed to flow therethrough.

Other advantages and objects of the invention will be apparent from the drawings and descriptions to follow.

BRIEF DESCRIPTION OF THE DRAWINGS

The following drawings are presented for illustration only, and should not be considered to limit the scope of the invention.

DETAILED DESCRIPTION OF THE PREFERRED EMBODIMENTS

Figure 1:
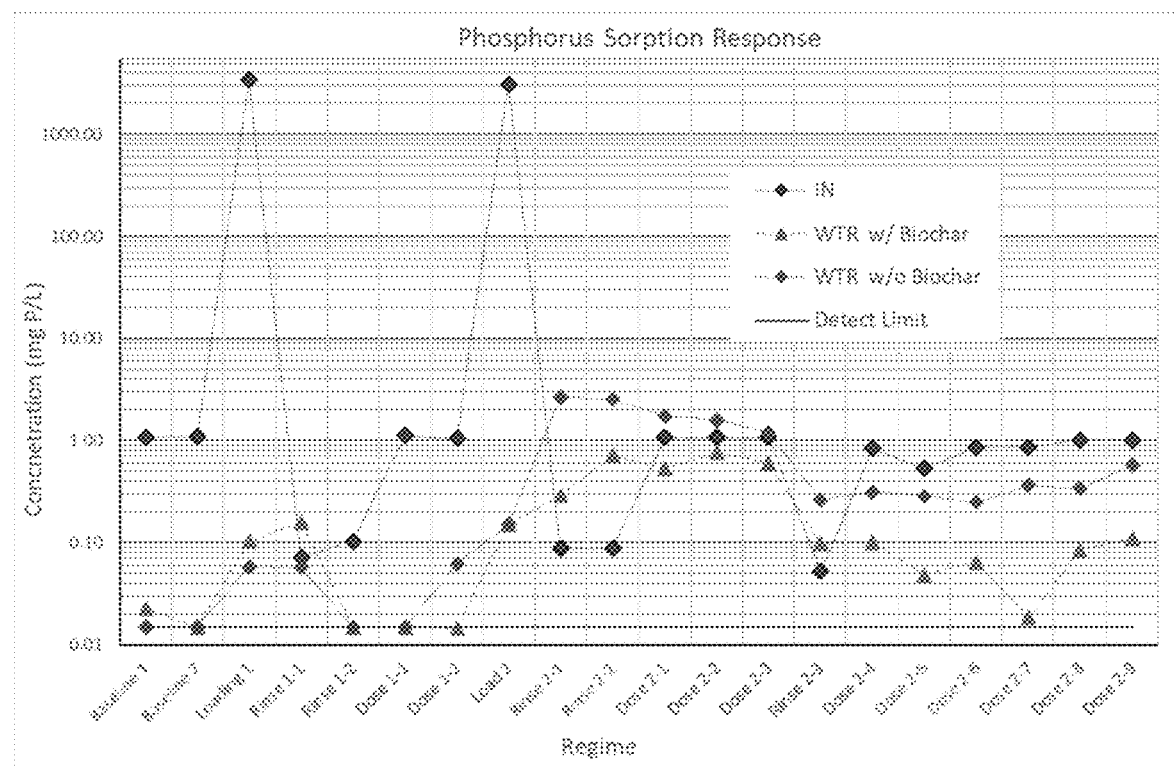
FIG. 1 is a graph illustrating the sorption of phosphorus by water treatment residuals, both with and without the addition of biochar in accordance with a preferred embodiment of the invention.

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Composition

Biochar comprises the organic carbon and ash residue remaining after pyrolysis, the process of heating organic material at high temperatures without or with sufficiently reduced oxygen. The effective lack of oxygen prevents the carbon in the source material from being burned, even when heated up to about 1100° F., 1200° F., or higher. Instead, the organic material is converted into a charcoal-like substance. Hardwood-derived biochar is commonly used on charcoal cooking grills.

The temperature sequence and duration of pyrolysis can affect the physical characteristics of the resulting biochar, such as its porosity and specific surface area (SSA). Higher temperatures and longer durations of pyrolysis lead to increased porosity and SSA. Higher SSA provides higher contact area and increased porosity increases retention time for reactions to occur when different materials come into intimate contact with the biochar. This means that higher pyrolysis temperatures should be favored when forming biochar for phosphorus (P) retention, from a contact time standpoint.

It has been determined that the source material for the biochar can have a major impact on the color removal and P sorbing properties of a particular biochar. These components can include anionic constituents such as calcium, magnesium, iron, aluminum and other elements. These positively charged anions tend to have a high affinity for negatively charged P, in distinct contrast to the negatively charged carbon matrix that comprises the majority of the biochar mass.

It has also been determined that the high temperatures that produce more porosity and SSA drive off many of these elements. As a result, a balance should be made between positive physical properties from high pyrolysis temperatures and longer durations as opposed to the resultant losses on geochemical potential P sorption capacity. The precise combination of temperature and duration for each potential source depends on the nature of the source and should be analyzed and monitored to find the optimal formation process for each individual material source. Such testing and analysis are well within the skill in the art.

Types of Biochar

Biochar can be made from almost any biological source, whether plant or animal based. In addition to hardwood or softwood trees, biochar can be derived from beet or sugar bagasse (the fibers left from beet or sugar pressings), peanut shells, corn cobs, wheat straw, bamboo, shrimp carapaces, egg shells, chicken manure, biosolids, as well as many more sources. It has been determined that the biochars derived from the animal sources have a relatively higher P sorption capacity, compared to the biochars derived from plant sources, which tend to have a lower P sorption capacity.

Performance of Different Types of Biochar

It should be noted that bagasse and wood-derived biochars are currently the only sources available in large quantities suitable for stormwater and wastewater treatment.

P adsorption by biochar has been found to be inadequate for P removal and less effective than WTRs. It can be quantified by the equilibrium concentration compared to the amount of P adsorbed. The lower value at a given quantity adsorbed indicates the more effective biochar. This is expressed in terms of mg/L discharged at accumulated mass in terms of g/kg.

Adsorption studies comprise several types. The most common are the Batch Studies, where a small quantity of biochar is immersed into a much larger quantity of water at different P concentrations for long durations (up to a week). The biochar absorbs some of the P, resulting in a lower concentration with the removed P being expressed in g/kg. Since these conditions are very unlike filtration systems, the preferred approach is using laboratory columns or field mesocosms (small-scale ecosystems). Pot and soil studies are similar.

Most of the biochars studied had either little-to-no effect or negative effects on P removal without the presence of WTRs. Where there was P removal, the discharge concentrations were much higher than suitable for environmental discharges, which should be no higher than 0.10 mg/L, and preferably lower.

The evaluation of the P sorption herein focuses on equilibrium concentrations in the range of about 0.1 mg/L at 5 to 10 g/kg, a small fraction of the 1-100 mg/l equilibrium concentrations reported in past studies. Therefore, even though some studies have shown that biochars can have a minor effect on P sorption at these concentrations, such low discharge concentrations are limited to very low mass accumulated.

Performance of Biochars with WTRs

The use of Water Treatment Residuals (WTRs) as a P adsorbent with very high capacity for retaining P while discharging at very low concentrations is described in U.S. Pat. Nos. 7,776,217 and 8,048,303, incorporated herein by reference. Properly selected and prepared, WTR-amended media can discharge at 0.02-0.04 mg/L at 1-2 g/kg WTR retained. Being a fraction of the concentration of P discharged from even the most effective biochar studies, this illustrates how the biochar contribution to P removal, even at its best, is still far below that which current WTRs can adsorb.

However, it has been determined that when combined properly, biochar can significantly promote color removal and P retention by WTRs and exhibit a synergistic, enhanced effect, beyond what could be predicted from the additive weights or P removal capacity of the separate materials. Using the same WTR with and without biochar, a series of column experiments were performed, where dosing runs are used to establish a baseline P removal response. The columns were then loaded with water having extremely high P concentrations, in excess of 3,100 mg/L P, to accelerate P accumulation by the media. This is termed as a loading cycle. The resultant discharge concentration was remarkably low, representing a 99.99% P retention.

This finding is based on using a softwood biochar mixed at a percentage by weight varying from 5% to 25%. But would be achieved with other types of biochar. This was added to an aluminum-based WTRs which were mixed at percentage by weight varying from 5% to 40%. A preferred range of biochar is over 5-10%, preferably about 10-20%. The media should have over about 10%, preferably about 10-35% or more WTRs. The remaining inert matrix can be any type of media, such as sand, preferably with a medium to coarse sand particle size, or a lightweight expanded clay or shale aggregate crushed to a medium to coarse sand particle size.

The loading cycle was then followed by a rinsing regime, using tap water, to rinse out excess P left over from the extreme load. Rinsing outflows are typically higher than inflows. A second series of dosing runs was then performed, to document the increase in outflow concentration due to the accumulated mass. A second loading cycle then further accelerated WTR P accumulation. This is followed by a second rinsing regime. Finally, a series of dosing runs is used to determine the discharge concentration after accumulating the increased mass. This trend is illustrated in FIG. 1. The results are tabulated in Table 1.

FIG. 1 presents an experimental record comparing WTR with Biochar, to WTR without Biochar mixtures. As can be seen in FIG. 1, the WTR with biochar mixture unpredictably performed significantly better than the WTR without biochar mixture, for every observation above the detection limit, except Load 1 and Rinse 1 runs. (Biochar without WTR has little to no P retention) As more tests were run, the difference between the two media become more pronounced. Table 1 (below) quantifies the resultant changes in discharge concentrations, percent removal and biochar reduction for the mass accumulated after each load.

TABLE 1

Inflow and Outflow Concentrations, Percent Removal, and WTR With Biochar Reduction P

| Dose Inflow (P mg/L) | WTR w/ Biochar (P mg/L) | WTR w/o Biochar (P mg/L) | Biochar P Reduction |
|---|---|---|---|
| After Load 1 (3.84 g/kg) | | | |
| 1.075 Dose Removal | 0.015 98.6% | 0.039 96.4% | 61.6% |
| After Load 2 (7.32 g/kg) | | | |
| 0.855 Dose Removal | 0.065 92.4% | 0.361 57.7% | 81.9% |

As shown in Table 1, the WTR media without the biochar had much less P sorption capacity than the WTR with biochar, especially after the second load. While the difference was not as pronounced in after the first load, the 455% increase in discharge concentration after the second load is significant with respect to the use of WTR without biochar where highly sensitive waters require very low P discharges, such as the Everglades that require discharges below the P detection limit of 0.010 mg/L. This ability to discharge at very low P concentrations is an important finding of this study. Only WTRs combined with biochar were able to discharge at such low P concentrations after accumulating high P loads.

Figure 2:
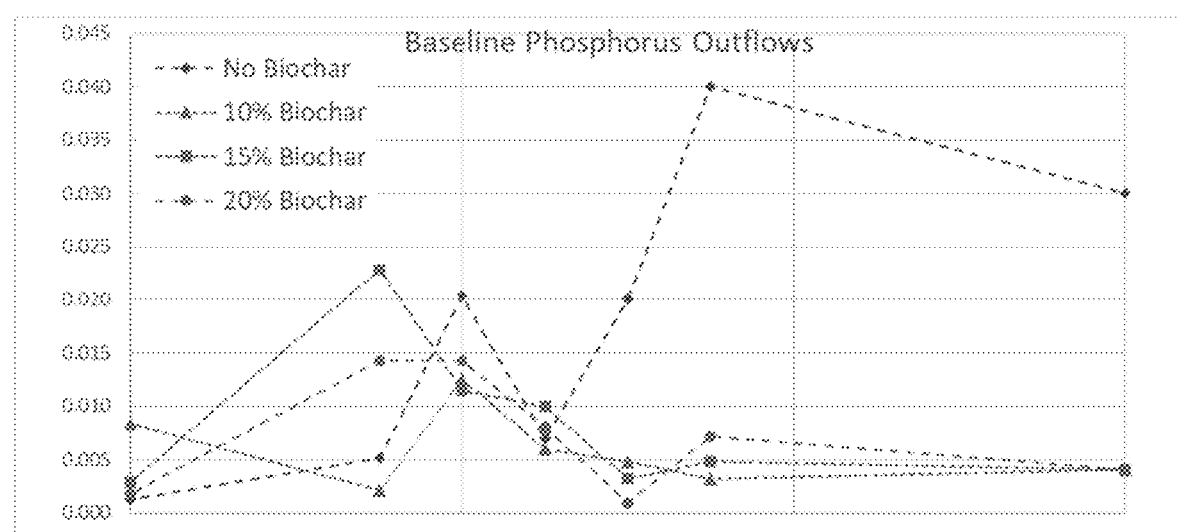
FIG. 2 is a graph illustrating the sorption of phosphorus by water treatment residuals, with differing ratios of biochar, in accordance with preferred embodiments of the invention.

FIG. 2 presents the results of a subsequent testing of the same source of WTRs blended with biochar at different ratios of 10% biochar, 15% biochar and 20% biochar as compared to no biochar, over a two week time period. The WTRs were held constant at 30% of the total media in all samples. In this case, once the systems all stabilized after several weeks of dosing, the biochar amended media discharged at concentrations roughly half that of the WTR media with no biochar. Table 2 summarizes the results of this testing.

TABLE 2

Inflow and Outflow Concentrations, and Increases in P Reduction Due to Biochar

| Dose Inflow (P mg/L) | WTR w/ No Biochar (P mg/L) | WTR with 10% Biochar (P mg/L) | WTR with 15% Biochar (P mg/L) | WTR with 20% Biochar (P mg/L) |
|---|---|---|---|---|
| 1.666 | 0.016 | 0.006 | 0.009 | .007 |
| Biochar P Reduction | — | 62.5% | 43.8% | 56.3% |

FIG. 2 presents the trend in concentrations over the testing period summarized in Table 2. Here it can be seen that the no biochar media actually discharged at several times that of the biochar-amended media in the later runs after the WTR only media had become fully stabilized. This further reinforces the trends illustrated in FIG. 1

Moreover, it is the ultimate long term performance of the WTR with biochar combination that also excels and perhaps, matters even more. This determines the ultimate capacity of the treatment system. At higher mass adsorbed, the WTR with biochar discharged at P concentrations 82% lower than without biochar. The P concentration of 0.065 mg/L is considered suitable for nearly all non-critical watersheds, while the discharge of 0.361 mg/L would not be acceptable. This much better performance at high mass loads accumulated means that a treatment system using WTRs with biochar will have a much longer useful life for a given discharge criterion.

These results were verified in a subsequent experiment after applying a load of 8.75 g/kg, another WTR media amended with 10% biochar leached P at 1.68 mg/L, over twice the 0.75 mg/L of the same WTRs amended with 20% biochar. These observations again illustrate how Biochar synergistically improves long term P retention by the media.

WTRs with biochar unexpectedly discharged at much lower concentrations for a given inflow at a given mass accumulated than WTRs without biochar. Preferred P reduction media is formed with a ratio (by volume) of biochar: WTR of at least 1:5, preferably 1:2 and more preferably, even greater. With WTRs comprising at least 20%, preferably 30% (by volume) of the media, inert material, such as sand or lightweight aggregates such as shale aggregates can be added to comprise up to 60% of the media for P reduction, preferably up to 55%, more preferably up to 50%. In many installations, the amount of inert material could be more or less. The addition of biochar to WTRs can enhance P removal of WTRs by at least 50% and often much higher, compared to WTRs alone.

As a nonlimiting example, the WTR that had accumulated 7.3 g/kg of phosphorus was subjected to an inflow P concentration of 1.0 mg/L and exhibited a P discharge at over 0.3 mg/L without biochar. This less than 70% P removal demonstrates the effective removal of P by WTRs alone. However, with the addition of biochar at 15% by weight and a biochar to WTR ratio of about 1:2 (by weight), the same weight amount of WTRs discharged only 0.065 mg/L of P, 82% lower than the WTR alone, at a removal over 92%. Note that biochar alone has essentially no P removal at these loads. With this amount of WTR, the discharge concentration without biochar would not be acceptable under most standards for discharge into receiving waters, while the lower discharge with biochars is protective of receiving waters and meets most standards.

WTRs with biochar can accumulate much more P while still discharging at a much lower concentration than WTRs without biochar.

By way of another nonlimiting example, WTRs that had accumulated 3.8 g/kg of phosphorus were subjected to an inflow P concentration of 1.0 mg/L and exhibited a P discharge at 0.049 mg/L without biochar. With biochar present at 15% by volume and a biochar to WTR ratio by volume of about 1:2, the same WTRs discharged P at only 0.019 mg/L to the same inflow concentration of 1.0 mg/L. The 0.049 mg/L discharged from the WTR without biochar was only 25% less than the 0.65 mg/L discharged by the WTR with biochar after almost twice as much P had been accumulated.

Color Removal

The final degradation products of decayed organic material, tannins, are responsible for the dark "tea colored" water seen in streams from many swamps, wetlands, stormwater runoff, and surface water. Removal of color from organic acids such as tannins is largely an abiotic media sorption process. Color in surface water or stormwater runoff can be caused by multiple sources. However, the primary cause of color in the water addressed herein refers to color caused by tannins in the water, which results primarily from decaying plant material, leached by the water. Nevertheless, the media disclosed herein can be quite effective at removing color from other sources. Tannins (or tannoids) are a class of astringent, polyphenolic biomolecules that bind to and precipitate proteins and various other organic compounds including amino acids and alkaloids. The term tannin can apply to any large polyphenolic compound containing sufficient hydroxyls and other suitable groups (such as carboxyls) to form strong complexes with various macromolecules. Tannin compounds are widely distributed in many species of plants. The leaching of tannins from decaying vegetation and leaves may produce what is known as blackwater, though the color is typically more tea colored.

One type of sorption is a process where a positively charged media sorbent adsorbs negatively charged tannin molecules. As more binding sites become occupied, the rate at which the media adsorbs color is reduced, eventually reaching a point of exhaustion where little further color removal occurs.

Color removal was achieved with media representing a combination of WTRs, biochar and optional filler, such as sand, preferably with a medium to coarse sand particle size, clay, or a lightweight aggregate crushed to a medium to coarse sand particle size. Biochar was mixed at a percentage by weight over 5%, preferably varying from 5% to 25% or more than 25% of the total media. The biochar was added to WTRs, preferably aluminum-based WTRs, which were mixed at percentage by weight over 5%, preferably varying from 5% to 40% or more than 40% of the total media. A preferred range of biochar is about 10-20% by weight. Preferred media can have about 10-35%, preferably 15-30% WTRs by weight. An effective ratio by weight or volume of WTR to biochar is loosely about 2:1, but ratios up to 5:1 and higher can be suitable for certain applications.

To determine the duration of effective performance of a sorbent, removal observations must extend for long periods of time to determine trends in sorption performance. The media should be subjected to enough of the projected lifetime loads for the long term performance of the media can be projected with any degree of confidence.

The following represents the result of a color removal column studies comprising three 12-inch columns packed with about 15% biochar and about 30% WTR (by volume) with plants installed. The filler was primarily crushed shale aggregate. The study was designed to measure performance for nearly a year's worth of loads to be more confident in projecting lifetime color removal media performance. Individual column responses were measured daily over 84 days. Prior to the study, the same media had been subjected to a 57 day pilot study, for a total experimental duration of 141 days. The color was applied at 2.8 feet per day, 40% higher than the design duty cycle of 66% which was reduced this hydraulic loading rate to 1.8 feet per day.

Since the column flows were applied constantly, and since the inflow color was much higher than its long term average, its 84 day duration was equivalent to another 191 days of field operations, while the pilot study was equivalent to another 58 days of field loading. This means that the columns were subjected to a total of 249 days (over 8 months) of equivalent field operations. As a result, these measurements provide a meaningful basis for projecting long term performance. These examples are presented for illustration only and should not be interpreted as limiting the scope of the invention.

Color Removal Results

Figure 3:
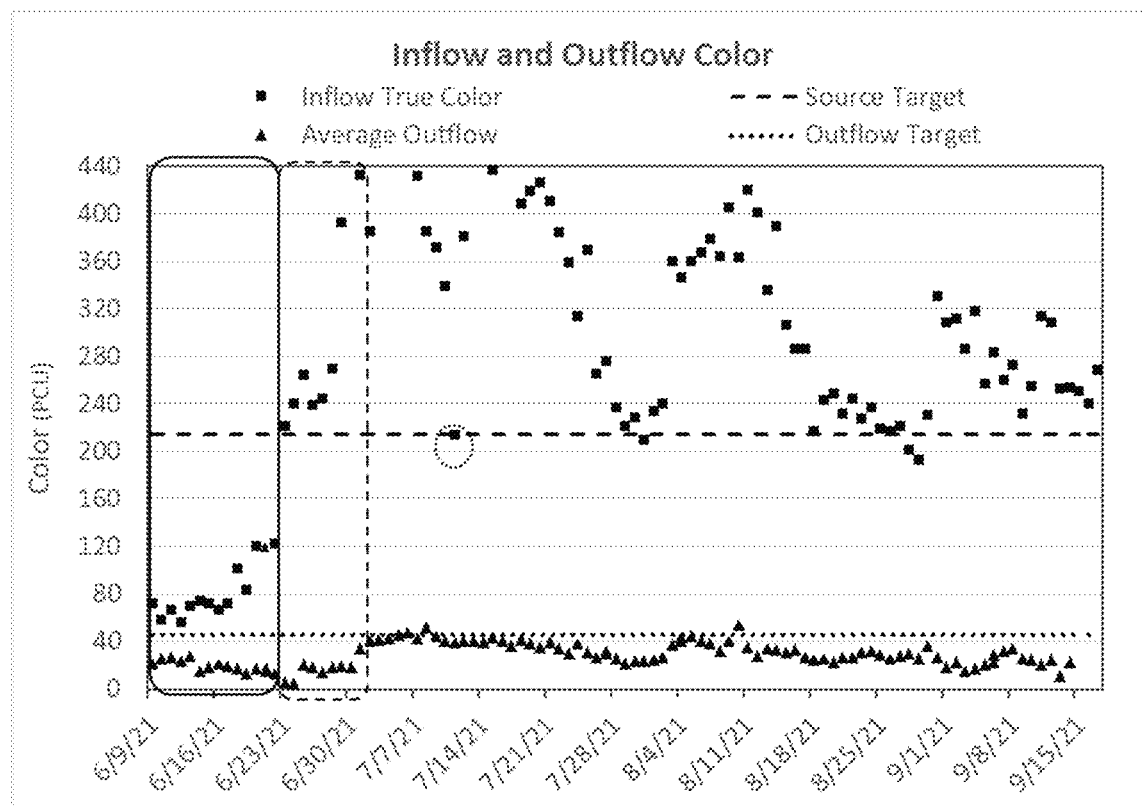
FIG. 3 is a graph illustrating color removal performance with media in accordance with preferred embodiments of the invention.

The color removal results of the column study are presented in FIG. 3. This shows the true color observed in inflows (squares), as compared to outflows (triangles). The dashed line shows the projected average inflow of 215 Platinum Cobalt Units (PCU), while the dotted line shows the lifetime target discharge geometric mean criterion of 46.2 PCU. Nearly all observed inflow color observations were substantially higher than this projected average inflow except for the first two weeks (shown in the solid box).

Outside of two observations, barely over 46.2 PCU discharge target, the rest of the outflows were well below this target, even though inflow color was much higher than the projected average. Outflow color remained very low or even decreased, even after the inflow color had increased by a factor of 6 (shown in the dashed box). This indicates that outflow color responses are affected by the inflow colors applied over the previous weeks. As a result of these inconsistent responses, this initial period of removal is not considered a representative baseline for color removal performance.

Trends in Color Removal Percentage

Figure 4:
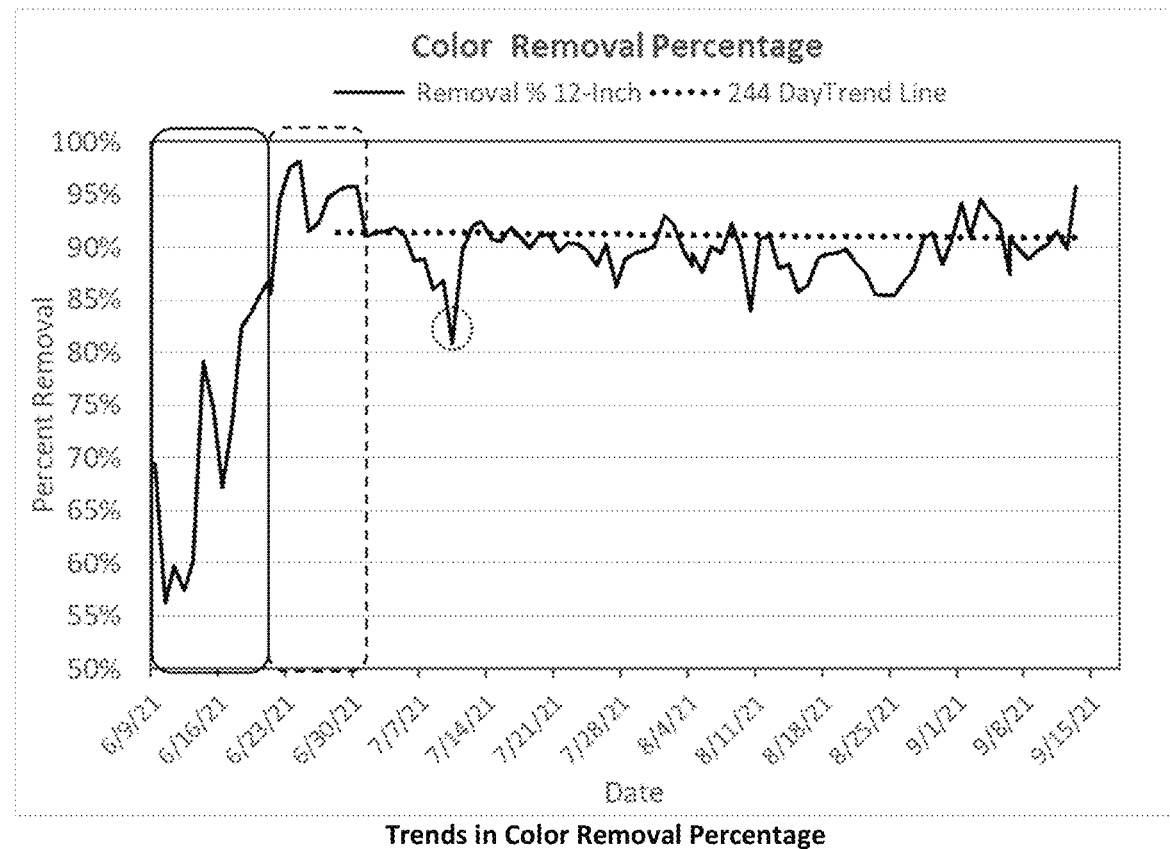
FIG. 4 is a graph illustration color removal percentage with media in accordance with preferred embodiments of the invention.

FIG. 4 presents the corresponding color removal percentages. In this case, the removal percentage was initially quite low due to the very low inflow color (first solid box). After this period, inflow color exceeded the inflow target of 215 PCU by a factor of two while outflow color actually decreased (second dashed box). As a result, the removal percentage jumped to 98%. As the system then equilibrated to the higher inflow color over the next 16 days, removal then abruptly dropped to 80% when one inflow observation fell back to the target (circled in FIGS. 3 and 4).

Once the system stabilized after a month, after these inflow fluctuations, baseline color removal was 89.6%, decreasing to 87.5% at the final two weeks of the study. Overall, removal during this period was 88.9%. This trend is illustrated by the dashed line in FIG. 4. The decline in color removal over this time from 91.5% to 90.9% represents a decrease in removal of 0.6% over 194 equivalent days of operations. Annualized, this extrapolates to a 1.1% reduction in removal over a year's worth of projected operations.

Since outflow color varies proportionally in response to inflow color, the percentage removal should be similar with different color inflows. This is illustrated by the narrow 10% band of removal percentages compared to the range in inflow colors varying by a factor of 240%. As a result, these changes in percentage removal represent the basis for metrics to be used to determine color removal performance.

Trends in Color Removal Loads

Figure 5:
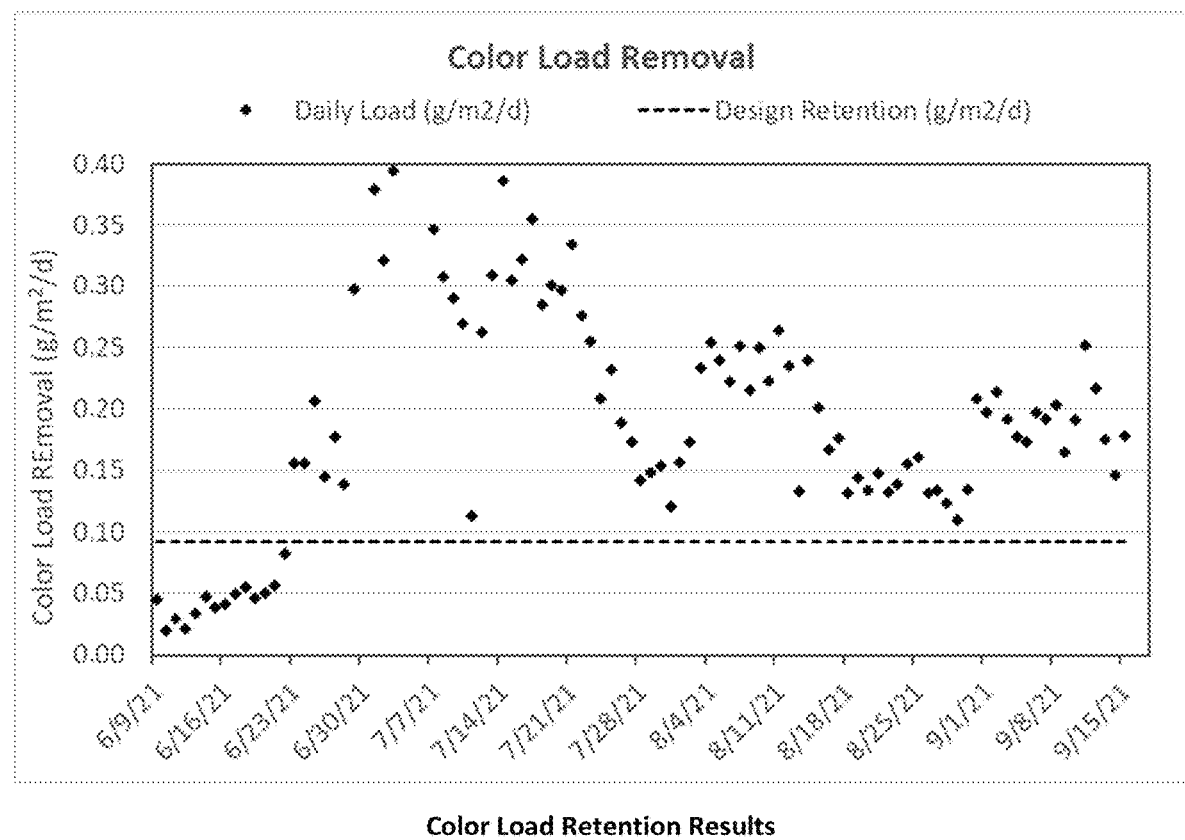
FIG. 5 is a graph illustrating color load retention with media in accordance with preferred embodiments of the invention.

Since true color is expressed in filtered Platinum Cobalt Units (PCU), one way to quantify color removal is to treat each unit of PCU as being equivalent to one "milligram" of color. Multiplying the PCU by the depth applied with each daily dose, the results can be expressed as "grams" of color per square meter per day ($g/m^2/d$). These inflow loads are shown in FIG. 5. The design load removals are shown in the dashed line. Total retention of the column study was 19.10 $g/m^2$. Adding the 5.12 $g/m^2$ removed by the pilot, the total load removed was 24.22 $g/m^2$. Given the total loads applied of 29.50 $g/m^2$, this represents a load reduction of 82.1%.

This color loading approach precisely quantifies the amount of daily color load actually treated, as opposed to daily removal percentages which do not account for the volume treated in a day. Therefore, color load computations can be the most appropriate metric for evaluating color removal.

Note that color load reductions closely follow the inflow color trends displayed in FIG. 3, but now they are precisely quantified. By keeping track of the amount of color load removed at a given date as compared to the load applied, the percentage of load removed can be precisely determined. In this case, the column media was subjected to a color load of 22.58 $g/m^2$, of which 19.10 $g/m^2$ were removed, for a mass load removal of 84.6%.

This provides the metric that to be applied in determining media color removal performance. Being 5.0% less than the overall average of daily color reductions of 89.6%, the projected load reduction percentages would be adjusted accordingly. As a result, load removal percentages would range from approximately 86.5% to 85.9.% during 194 equivalent days of color loading. Total load removal after 19.1 g/m2 have been retained should be at least 84.6%.

Given these criteria, it is now possible to rigorously determine if the media is performing as intended. The formula for quantifying the percent removal against load accumulated follows:

$$\text{Percent reduction per equivalent day} = 0.6\% \text{ divided by 194 equivalent days} = 0.0031\% \text{ decline per day} \quad (1).$$

Equivalent days are determined by the mass load applied divided by 0.119 $g/m^2/d$, the amount of color that would be removed to meet the criteria in an 11.2 acre system. This value is not affected by system size, since it is a unit area loading rate. The initial percentage is determined from load reductions observed after a month of operation. The decline in removal percentage would follow that trend.

For example, if the load applied is 4.0 $g/m^2$, that comes to 33.6 equivalent days, so the percentage reduction should be no greater than 33.6×0.006%=0.10%. Over a year, the percentage decline should be 1.1%, and no greater than 5.2%.

Projected Lifetime

The relatively stable removal rates were then statistically evaluated to project long term trends. Due to the high degree of variability in inflow color, along with the variable responses observed, 150,000 different combinations of inflow and outflow color were statistically evaluated. Plotting the frequency distribution of these different scenarios, the most frequent of these scenarios indicated that color removal would meet the geometric mean discharge criterion of 46.2 PCU for 9.9 years.

This study shows how the media used in this study can remove color for up to a decade, and perhaps longer. This provides for a natural low cost option to remove color compared to expensive and hazardous chemical process methods. It requires minimal operational expenses compared to process systems requiring dedicated staffing and constant supervision. It is very well suited for settings in remote areas where dedicated staffing and supervision is difficult to provide.

Thus, the media disclosed herein is capable of removing color hydraulic loading rates of over 1 foot per day, preferably over 2.5 feet per day, most preferably over 2.8 feet per day with over 50%, preferably over 75%, most preferably over 90% color removal. This color removal can decline over time. The rate of decline varies from under 10%, preferably under 7.5% per year. Reductions of 1.1% to 5.2% per year of color load applied were observed.

The biochar, WTR and filler media described herein was able to reduce color to 5 PCU or lower, especially if fresh, and inflow is relatively low. Removal levels as high as 98% color removal were observed. The media can be formulated and adapted to reduce the color of water having a color content of 50 Platinum Cobalt Units (PCUs) and lower, caused by tannins in the water by at least 50%, even over 70% or 90% for at least 30 days, preferably for at least a year. Depending on requirements, for example, in clear lakes, color should not be over 20 PCU. Reductions to this level and as low as 5 PCU can be achieved. Reductions were observed from 265 to under 4. Even as columns aged and input varied, color was reduced from 287 to 15.3 PCU (93%), and from 252 to 11 (96%).

Note that where this application has listed the steps of a method or procedure in a specific order, it may be possible, or even expedient in certain circumstances, to change the order in which some steps are performed, and it is intended that the particular steps of the method or procedure claim set forth below not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A media formulated and adapted to remove at least 50% of the PCU color content of tannin-induced color from water flowing into the media, comprising a water treatment residual (WTR) component mixed with a biochar component and an optional filler component.

2. The media of claim 1, wherein the biochar component has about the same dimensions as the WTR component.

3. The media of claim 1, wherein the biochar component is formed from a plant source.

4. The media of claim 1, wherein the biochar component is formed from a hardwood source.

5. The media of claim 1 formulated and adapted to remove color from colored water with a 12 inch tall column at a hydraulic loading rate of at least 1 foot of water flowing into the column per day for at least 30 days.

6. The media of claim 1, wherein the biochar component is included as at least 5% by weight of the total media.

7. The media of claim 1, wherein the weight ratio of the biochar component to the WTR component is at least 1:5.

8. The media of claim 1, wherein the weight ratio of the biochar component to the WTR component is at least 1:2.

9. The media of claim 1, wherein the WTR component comprises at least about 20% by weight of the media.

10. The media of claim 1, wherein the WTR component comprises at least about 30% by weight of the media.

11. The media of claim 1, wherein the WTR component and the biochar component, combined, comprise at least 30% of the media by weight.

12. A method for removing tannin induced color from water resulting from stormwater runoff or surface water, comprising:

directing water having a color content of at least 50 PCU caused by tannins in the water into a media comprising WTRs and biochar and reducing the color content by at least 50%.

13. The method of claim 12, wherein the media is formulated such that a 12 inch layer of the media removes color from colored water flowing into the media at a hydraulic loading rate of over 1 foot per day for at least 30 days.

14. The method of claim 12, wherein a 12 inch thick layer of the media is formulated to remove color from colored water flowing into the layer of media at a hydraulic loading rate of over 2.5 feet per day for at least one year.

15. The method of claim 12, wherein the media removes over 75% of the color content of the water flowing into the media for at least 30 days.

16. The method of claim 12, wherein the media is formulated such that a 12 inch layer of the media removes color from colored water flowing into the media at a hydraulic loading rate of over 2 feet per day, at a rate of decline equivalent to under 10% per year.

17. A system for reducing color in surface water or stormwater runoff, comprising a media storage area having an inlet adapted and positioned to receive stormwater runoff or surface water, the media storage area containing a color reduction media comprising at least 5% by weight of a biochar component combined with at least 5% by weight of a WTR component, in a biochar to WTR weight ratio of at least 1:5, the color reduction media positioned and adapted to receive the stormwater runoff or surface water from the inlet, and an outlet adapted to discharge the water after the water passes over the media, the media formulated and adapted to reduce the color of water having a color content of at least 50 PCU caused by tannins in the water by at least 50% for at least 30 days.

* * * * *